(12) United States Patent
Schwager et al.

(10) Patent No.: US 10,353,066 B2
(45) Date of Patent: Jul. 16, 2019

(54) CAMERA WITH RADAR-BASED AUTOFOCUS

(71) Applicant: SONY CORPORATION, Tokyo (JP)

(72) Inventors: Andreas Schwager, Waiblingen (DE); Martin Rebert, Colmar (FR); Dietmar Schill, Ludwigsburg (DE)

(73) Assignee: SONY CORPORATION, Tokyo (JP)

( * ) Notice: Subject to any disclaimer, the term of this patent is extended or adjusted under 35 U.S.C. 154(b) by 129 days.

(21) Appl. No.: 15/111,106

(22) PCT Filed: Jan. 16, 2015

(86) PCT No.: PCT/EP2015/050802
§ 371 (c)(1),
(2) Date: Jul. 12, 2016

(87) PCT Pub. No.: WO2015/110363
PCT Pub. Date: Jul. 30, 2015

(65) Prior Publication Data
US 2016/0327643 A1      Nov. 10, 2016

(30) Foreign Application Priority Data

Jan. 24, 2014   (EP) .................................. 14152455

(51) Int. Cl.
*G01S 13/58*     (2006.01)
*G01S 13/08*     (2006.01)
(Continued)

(52) U.S. Cl.
CPC ............ *G01S 13/867* (2013.01); *G01S 13/08* (2013.01); *G01S 13/58* (2013.01); *G03B 13/20* (2013.01); *G03B 13/36* (2013.01)

(58) Field of Classification Search
CPC ........ G01S 13/08; G01S 13/58; G01S 13/867; G03B 13/20; G03B 13/36
(Continued)

(56) References Cited

U.S. PATENT DOCUMENTS

| 4,534,629 A | 8/1985 | Bogle et al. |
| 8,115,670 B2 | 2/2012 | Klein et al. |

(Continued)

FOREIGN PATENT DOCUMENTS

| DE | 19749167 | 6/1998 |
| DE | 202012103986 | 11/2012 |

(Continued)

OTHER PUBLICATIONS

Roland Minihold, et al., "Introduction to Radar System and Component Tests White Paper," Rohde & Schwarz, Aug. 2012; 29 pages.

(Continued)

*Primary Examiner* — Timothy X Pham
(74) *Attorney, Agent, or Firm* — Xsensus, LLP

(57) ABSTRACT

A camera includes an optical system configured to record images based on light entering the optical system from an optical field of view, the optical system including a focusing unit configured to focus the optical system on a target in the optical field of view, a radar system configured to obtain distance and speed information of targets within a radar field of view that is overlapping with the optical field of view, the distance and speed information indicating the distance and speed of targets with respect to the camera, and a control unit configured to control the focusing unit to focus the optical system on a target based on a selected distance and/or a selected speed.

19 Claims, 5 Drawing Sheets

(51) Int. Cl.
*G01S 13/86* (2006.01)
*G03B 13/36* (2006.01)
*G03B 13/20* (2006.01)

(58) Field of Classification Search
USPC .......................................................... 342/66
See application file for complete search history.

(56) References Cited

U.S. PATENT DOCUMENTS

| | | | |
|---|---|---|---|
| 8,299,957 B2 | 10/2012 | Tseng | |
| 8,446,467 B2 | 5/2013 | Tilton et al. | |
| 2008/0117094 A1 | 5/2008 | Lindoff et al. | |
| 2008/0240698 A1 | 10/2008 | Bartilson et al. | |
| 2012/0330528 A1 | 12/2012 | Schwindt et al. | |
| 2013/0293688 A1 | 11/2013 | Benson et al. | |
| 2013/0308038 A1* | 11/2013 | Miyajima | G02B 7/34 348/345 |
| 2015/0355320 A1* | 12/2015 | Kim | G01S 13/0209 342/21 |
| 2016/0048975 A9* | 2/2016 | Tuxen | A63B 24/0021 382/103 |
| 2016/0086466 A1* | 3/2016 | Foster | G08B 13/2494 348/143 |
| 2016/0193999 A1* | 7/2016 | Sasabuchi | B60T 7/22 701/301 |
| 2016/0291146 A1* | 10/2016 | Wang | G01S 7/03 |
| 2016/0306037 A1* | 10/2016 | Johnson | G01S 7/4026 |

FOREIGN PATENT DOCUMENTS

| | | |
|---|---|---|
| EP | 2 660 643 A2 | 11/2013 |
| WO | 2008/058770 A1 | 5/2008 |
| WO | 2008/117141 A1 | 10/2008 |
| WO | 2012/089206 | 7/2012 |
| WO | 2012/120856 A1 | 9/2012 |

OTHER PUBLICATIONS

Christian Sturm, "Gemeinsame Realisierung von Radar-Sensorik und Funkkommunikation mit OFDM-Signalen," KIT Scientific Publishing, 2012, 212 pages.

Arunesh Roy, et al., "Fusion of Doppler Radar and Video information for Automated Traffic Surveillance," $12^{th}$ International Conference on Information Fusion, 2009, 8 pages.

Martin Braun, et al., "A USRP-based Testbed for OFDM-based Radar and Communication Systems," Proceedings of $22^{nd}$ Virginia Tech Symposium on Wireless Communications, 2012, 6 pages.

International Search Report and Written Opinion of the International Searching Authority dated Apr. 21, 2015 in PCT/EP215/050802 Filed Jan. 16, 2015.

European Examiner Report and dated Oct. 24, 2018 in European Application No. 15701142.0-1206.

* cited by examiner

CAMERA WITH RADAR-BASED AUTOFOCUS

CROSS-REFERENCE TO RELATED APPLICATIONS

The present application is based on PCT filing PCT/EP23015/050802 filed Jan. 16, 2015, and claims priority to European Patent Application 14152455.3 filed by the European Patent Office of 24 Jan. 2014, the entire contents of each of which being incorporated hereby by reference.

BACKGROUND

Field of the Disclosure

The present disclosure relates to a camera as well as to an autofocus system and an autofocus control method for a camera. Further, the present disclosure relates to a computer program and a non-transitory computer-readable recording medium.

Description of Related Art

Today's autofocus systems rely on infrared (IR) illuminations and today's autofocus sensors cannot measure the speed of objects. These autofocus systems use an assist lamp usually interfering people's mood before a snapshot. Radar based focus systems do not need an assist lamb. Simple or conventional ultrasonic signals are also used to measure the distance to the object.

Known Single Input—Single Output (SISO) FMCW (frequency modulated continuous wave) radars are able to measure the speed (Doppler) of the reflected signals, but also cannot isolate the object with the fastest movement in case of multiple objects.

Further, there are AI (artificial intelligence) servo focus systems on the market, e.g. used in the Sony α99 camera. Such AI servo focus systems generally use algorithms that constantly predict where a subject is about to be based on its speed and acceleration data from the autofocus sensor. AI servo is known also as "continuous focus" (AF-C). In focus tracking, it is used to track a subject as it moves around the frame, or towards and away from the camera. When in use, the lens will constantly maintain its focus on the subject, for which purpose it is commonly used for sports and action photography. The AI servo approach is a higher layer calculation of the speed and movements measurements. The artificial intelligence algorithms require lots of processing power raising the price and battery consumption of the camera system. Additionally this processing causes delay when recording a snapshot. Furthermore such processing has to be aware of the history of the scene to follow and predict the movement of the object. Sudden snapshots focusing to the objects with highest velocity are impossible.

Other focusing systems do not measure the distance to the object. They rely on sharpening the edges or optimizing the contrast in the picture content. The user touches the location on the screen that he likes to sharpen. The lens wobbles its dynamic range where an algorithm monitors at which lens position the sharpest image is achieved. Finally this lens position is selected. This method is time consuming and too slow for sports photographing, e.g. for focusing on a tennis racket when hitting the ball.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a camera as well as to an autofocus system and an autofocus control method for a camera that enable a focusing on fast objects within a scene. It is a further object to provide a computer program and a non-transitory computer-readable recording medium.

According to an aspect there is provided a camera comprising
- an optical system configured to record images based on light entering the optical system from an optical field of view, said optical system comprising a focusing unit configured to focus said optical system on a target in the optical field of view,
- a radar system configured to obtain distance and speed information of targets within a radar field of view that is overlapping with said optical field of view, said distance and speed information indicating the distance and speed of targets with respect to the camera, and
- a control unit configured to control the focusing unit to focus said optical system on a target based on a selected distance and/or a selected speed.

According to a further aspect there is provided an autofocus system comprising
- a focusing unit configured to focus an optical system of the camera provided for recording images based on light entering the optical system from an optical field of view on a target in the optical field of view, and
- a control unit configured to control the focusing unit to focus said optical system on a target based on a selected distance and/or a selected speed provided by a radar system of the camera provided for obtaining distance and speed information of targets within a radar field of view that is overlapping with said optical field of view, said distance and speed information indicating the distance and speed of targets with respect to the camera.

According to a further aspect there is provided an autofocus control method comprising
- receiving distance and speed information of targets within a radar field of view that is overlapping with an optical field of view of an optical system of the camera provided for recording images based on light entering the optical system from an optical field of view on a target in the optical field of view, said distance and speed information being provided by a radar system of the camera provided for obtaining distance and speed information of targets within the radar field of view and indicating the distance and speed of targets with respect to the camera, and
- controlling a focusing unit of the camera to focus said optical system on a target based on a selected distance and/or a selected speed selected from the receiving distance and speed information.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed autofocus system and autofocus control method, the disclosed computer program and the disclosed computer-readable recording medium have similar and/or identical preferred embodiments as the claimed camera and as defined in the dependent claims.

One of the aspects of the disclosure is to use a radar system for focusing the camera optics. In particular, distance and speed information of targets (also called objects) within a radar field of view is obtained by the radar system. This distance and speed information is then used for focusing the camera's optical system on a target based on a selected distance and/or a selected speed for instance on the fastest target.

For instance, in an embodiment an OFDM radar is used in a still picture or movie camera, which is able to focus the lenses on the target in the scene having the highest velocity. Frequently, in sports photographs the target with highest velocity is the most interesting one and desired to be in the focus. Utilizing an OFDM radar signal a Doppler-Range matrix can be calculated. Such a matrix enables to identify which target or object has the highest speed, e.g. in direction to the radar. Thereafter, its distance to the radar is determined from the Doppler-Range matrix, which distance is then used to focus the objective/lens onto said distance and, thus, onto the fastest target at said distance. By use of the OFDM radar the speed and distance information is available after calculating a two-dimensional Fourier transformation on the radar sensor data.

The proposed camera and method are able to provide and use additional information that is not available in known cameras or systems. Desired or new applications can thus be implemented in a rather inexpensive and comfortable manner enabling the realization of a consumer friendly and consumer affordable camera.

Today's high end still picture cameras still have a moving mirror implemented to mirror the IR light to the IR sensor before the picture is captured. Using a radar based autofocus, as proposed according to the present disclosure, the moving mirror is no more needed.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
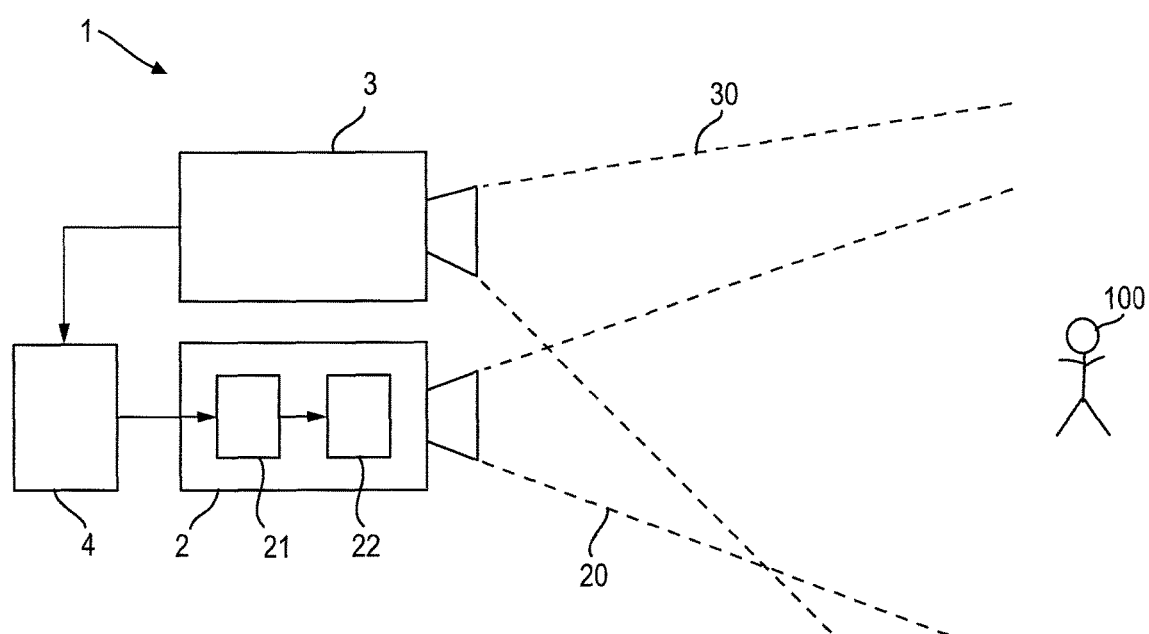
FIG. 1 shows a schematic diagram of the general layout of a camera according to the present disclosure.

Referring now to the drawings, wherein like reference numerals designate identical or corresponding parts throughout the several views, FIG. 1 shows a schematic diagram of the general layout of a camera 1 according to the present disclosure, which may be a still picture camera or a video camera. The camera 1 generally comprises an optical system 2 that records images based on light entering the optical system 2 from an optical field of view 20. The optical system 2 particularly comprises a focusing unit 21 that is configured to focus said optical system 2, in particular camera optics 22, such as a lens, lens arrangement and/or objective, on a target 100 in the optical field of view 20. Further, a radar system 3 is provided that obtains distance and speed information of targets within a radar field of view 30 that is overlapping with said optical field of view 20 of the optical system. Said distance and speed information indicates the distance and speed of targets with respect to the camera 1. Finally, a control unit 4 is provided that controls the focusing unit 21 to focus said optical system 2 on a target based on a selected distance and/or a selected speed.

Preferably, the radar field of view 30 substantially overlaps, coincides or is even larger than the optical field of view 20, i.e. completely covers the optical field of view 20. The radar field of view 30 may be static, while the optical field of view may generally be variable in case of using zoom optics. Hence, the size and orientation of the radar field of view 30 may be adapted to correspond to the size and orientation of the maximally possible optical field of view 20, or the size and orientation of the radar field of view 30 may be made adaptive so that it can "follow" the size and orientation of the optical field of view.

It shall be noted that the control unit 4 may also be part of the optical system 2 and/or the radar system 3. Further, the focusing unit 21 and the control unit 4 can together be considered as an autofocus system, which may be arranged within or without the optical system and which may be available as a separate unit, implemented in hard- and/or software, and provided originally in the camera or as additional add-on unit for later improvement of the camera.

Usually, in sports photographing the scene or the target providing fastest velocity is the most interesting one. Due to the high motion it is difficult for the photographer to focus on the fastest target. Frequently, at sports photographing multiple targets in individual distances are visible. Known autofocus systems, however, often focus on another target. For instance, in soccer the photographer is located behind the goal. Goal net, goal post, goalkeeper and fullback players are located in the foreground, and the arena, spectators and other players are located in the background. The forward player is going to kick the ball. The leg of the player is expected to be the target with fastest velocity towards the photographer. This target shall be focused by the camera out of the multiple targets in the scene. Further applications may be to setup a self-timer which triggers at any motion higher than a given speed threshold or to trigger on speed in a particular direction, in particular towards or away from the camera.

OFDM radar systems output after a two-dimensional Fourier Transform (2D-FFT) (usually implemented using a Fast Fourier Transformation) a two-dimensional matrix (also called Range-Doppler-Matrix) containing distance and speed information of targets where for each target within the radar field of view the distance and speed information is provided. A detailed description of this process and the formation of such a matrix can be found in the above mentioned documents, in particular in section II of the paper of Martin Braun et al. (said matrix being referred to as periodogram there) and section 2.5 of the PhD Thesis of Christian Sturm, which descriptions are herein incorporated by reference.

Figure 2B:
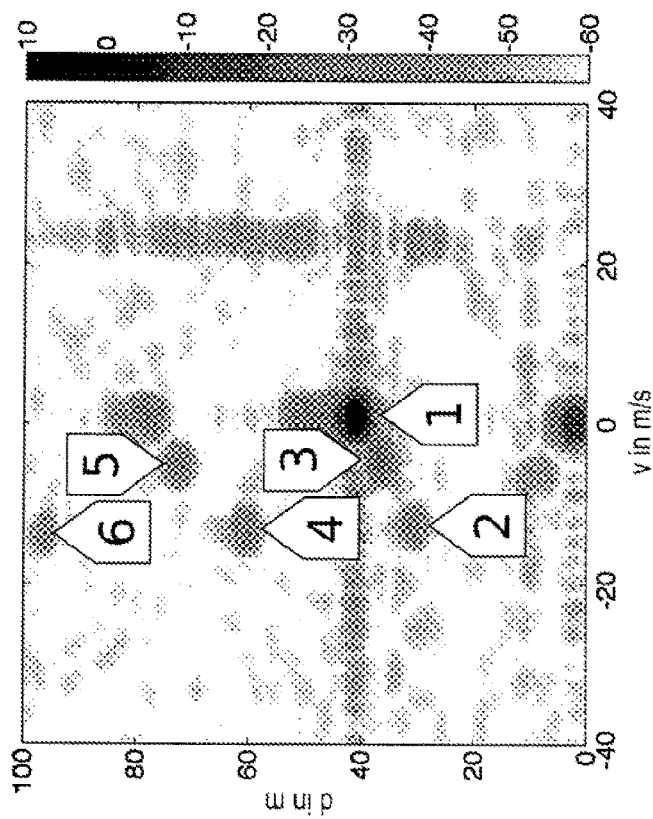
FIG. 2 shows a photograph of a scene and a corresponding Doppler-Range matrix.
Figure 2A:
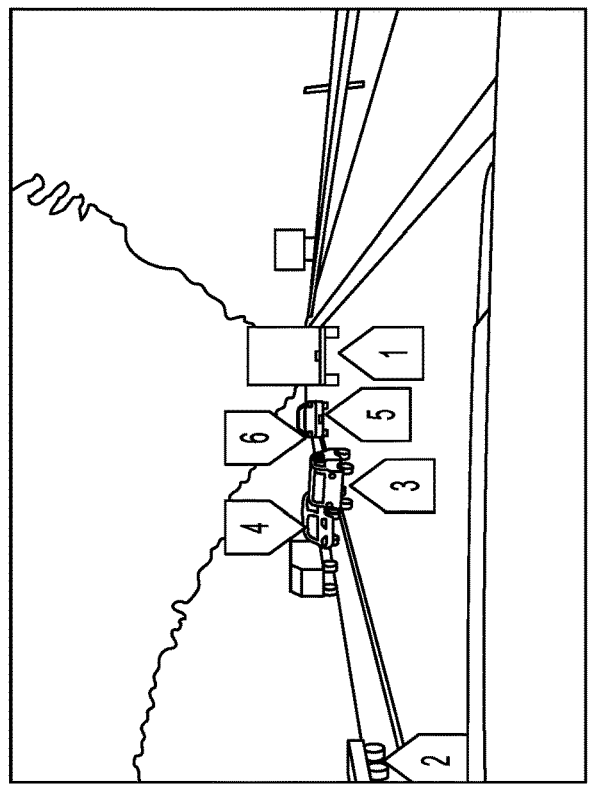

FIG. 2A shows a scene photographed on a German highway, where three cars on the left lane pass with highest speed two other cars on the middle lane passing a truck on the right lane. FIG. 2B shows the corresponding radar image recoded using an OFDM radar system. This radar image provides the relation between Doppler (relative speed v with respect to the OFDM radar system) and range (distance d with respect to the OFDM radar system) of each target in the scene. Cars ("targets") identified in the picture (labeled by "1" to "6") are also labeled in the radar image. FIGS. 2A and 2B are taken from the PhD Thesis of Christian Sturm (FIGS. 4.8 and 4.9).

Figure 3:
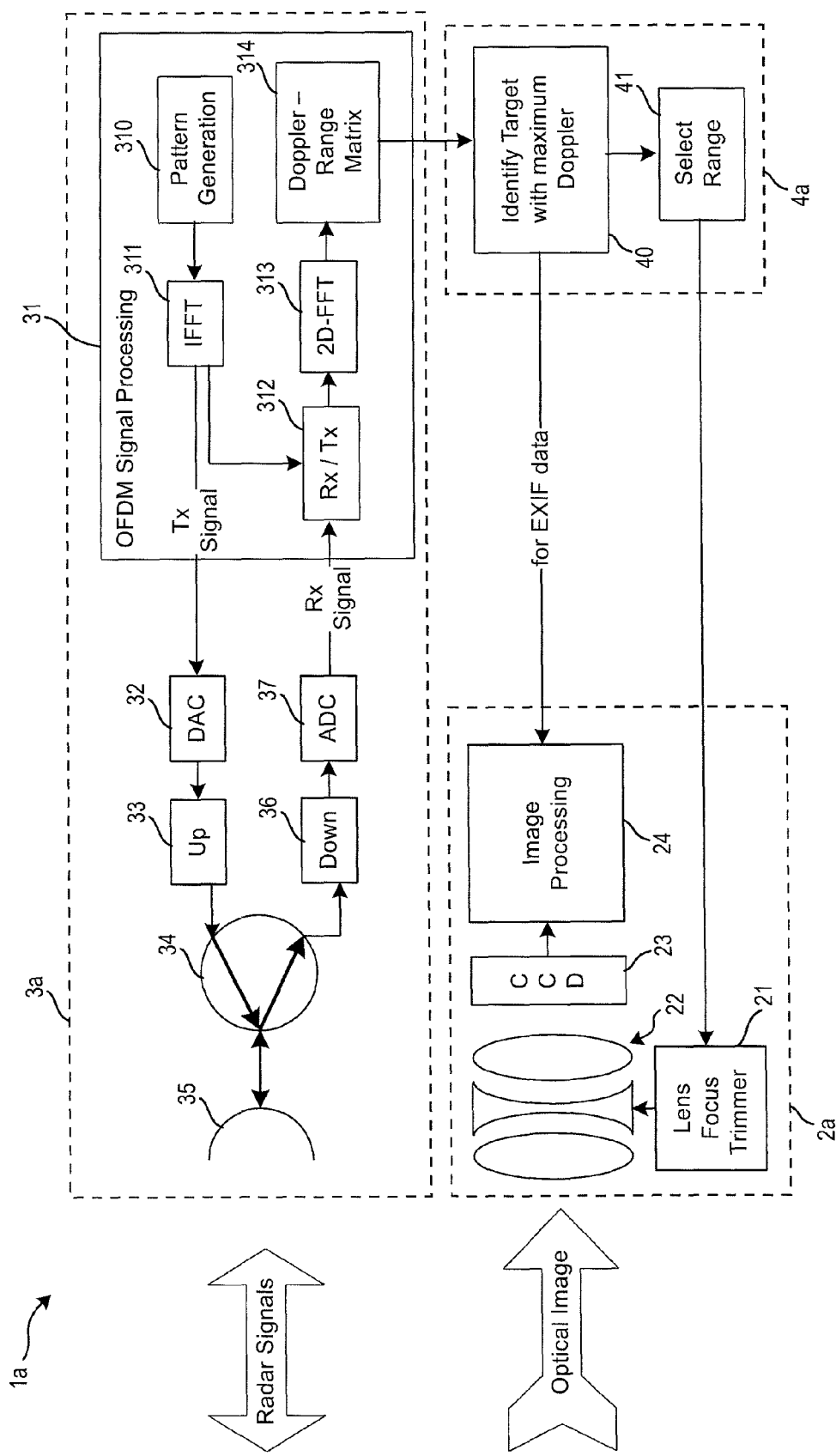
FIG. 3 shows of a schematic diagram a first embodiment of a camera according to the present disclosure.
Figure 4:
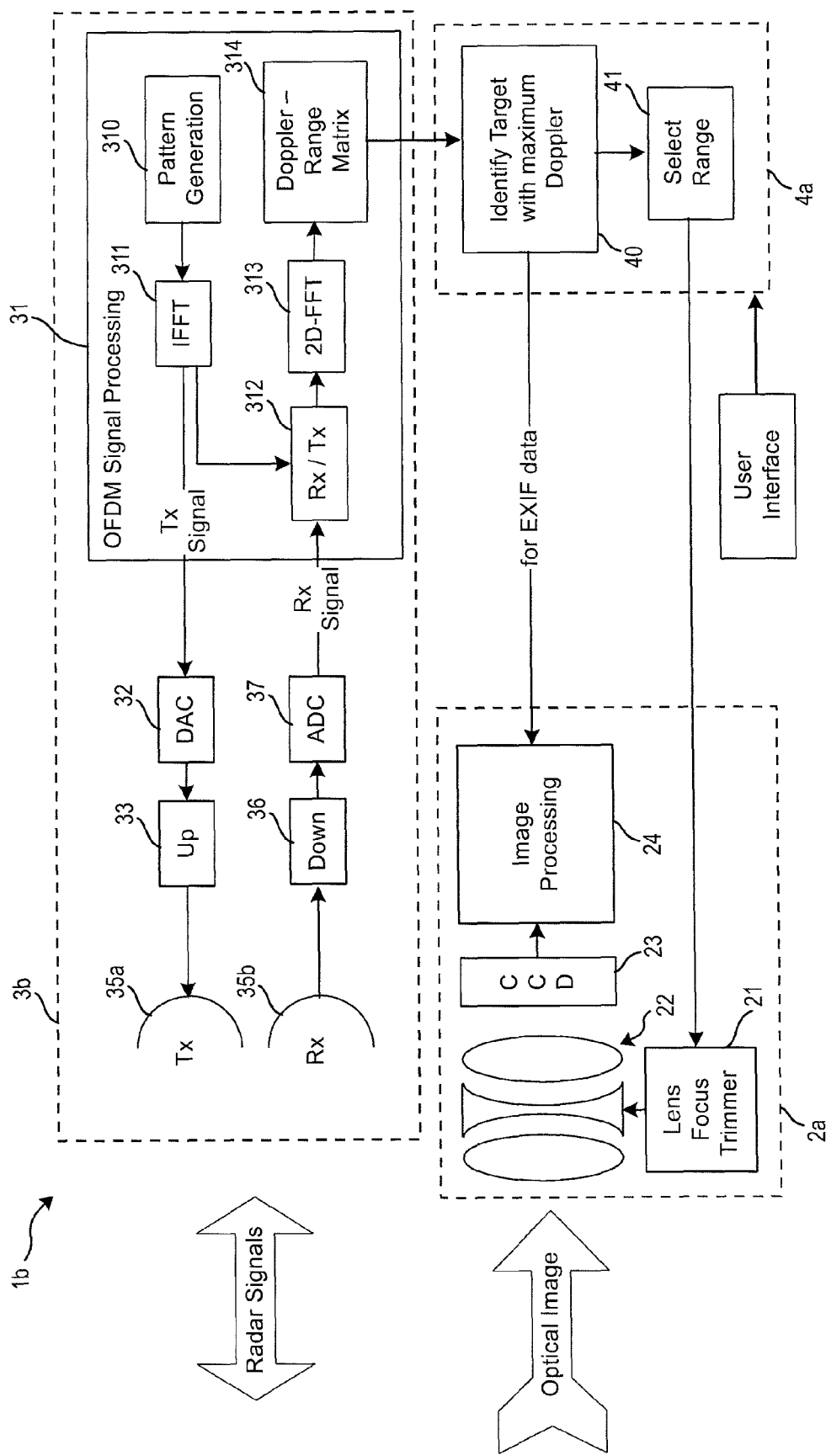
FIG. 4 shows a schematic diagram of a second embodiment of a camera according to the present disclosure.

FIGS. 3 and 4 show schematic diagrams of a first and second, more detailed embodiments of a camera 1a, 1b according to the present disclosure. These embodiments will be explained with reference to the application that the fastest moving target shall be focused on by the camera 1a, 1b. It shall, however, be noted that the same cameras can be used for other applications and in other modes, as will be explained further down below. Further, the radar system is an OFDM radar system, while other radar systems may be used as well.

The OFMD radar system 3a comprises an OFDM signal procession unit 31 which may be implemented in an integrated circuit (IC). It includes a pattern generator 310 to generate the information or data to be transmitted. There are various additional applications possible (as explained below) where the transmit data could additionally be utilized. Generally, for obtaining the desired distance and speed information random data may be used for transmission by the OFDM radar system. The data are processed by an IFFT unit 311 to generate the OFDM signals to be transmitted as Tx signal. A digital to analog converter (DAC) 32 forwards the OFDM signal to an up-converter 33 shifting the signal into the high frequency range (e.g. to 24 GHz or 77 GHz). The directional bridge 34 guides the transmit signals to the antenna 35 where the received signals are guided to the frequency down converter 36 and the analog to digital converter (ADC) 37 creating the digital receive signal (Rx signal).

In this embodiment of the camera 1a shown in FIG. 3 one bidirectional antenna 35 is used for transmitting and receiving the radar signals. However, the autofocus application proposed by the present disclosure may also be implemented using two antennas 35a, 35b, one (35a) for transmitting and the other one (35b) for receiving as providing in the embodiment of the camera 1b shown in FIG. 4 comprising another embodiment of the radar system 3b. In this dual antenna approach the directional bridge 34 is not needed.

Subsequently, in the OFDM signal processing unit 31 the Rx signal is divided in a divider 312 by the Tx signal resulting in a channel estimation information of each OFDM symbol. This information is collected in a time-frequency matrix where the OFDM symbols are aligned in time and frequency domain. The 2D-FFT unit 313 calculates the Doppler-Range matrix. In an analysis unit 134 the Doppler information is derived out of the FFT over the time axis and the range information is derived out of the FFT over the frequency axis. More details about how to obtain such a matrix including distance and speed information of targets within a scene can be found in the above mentioned theses and paper.

Figure 5:
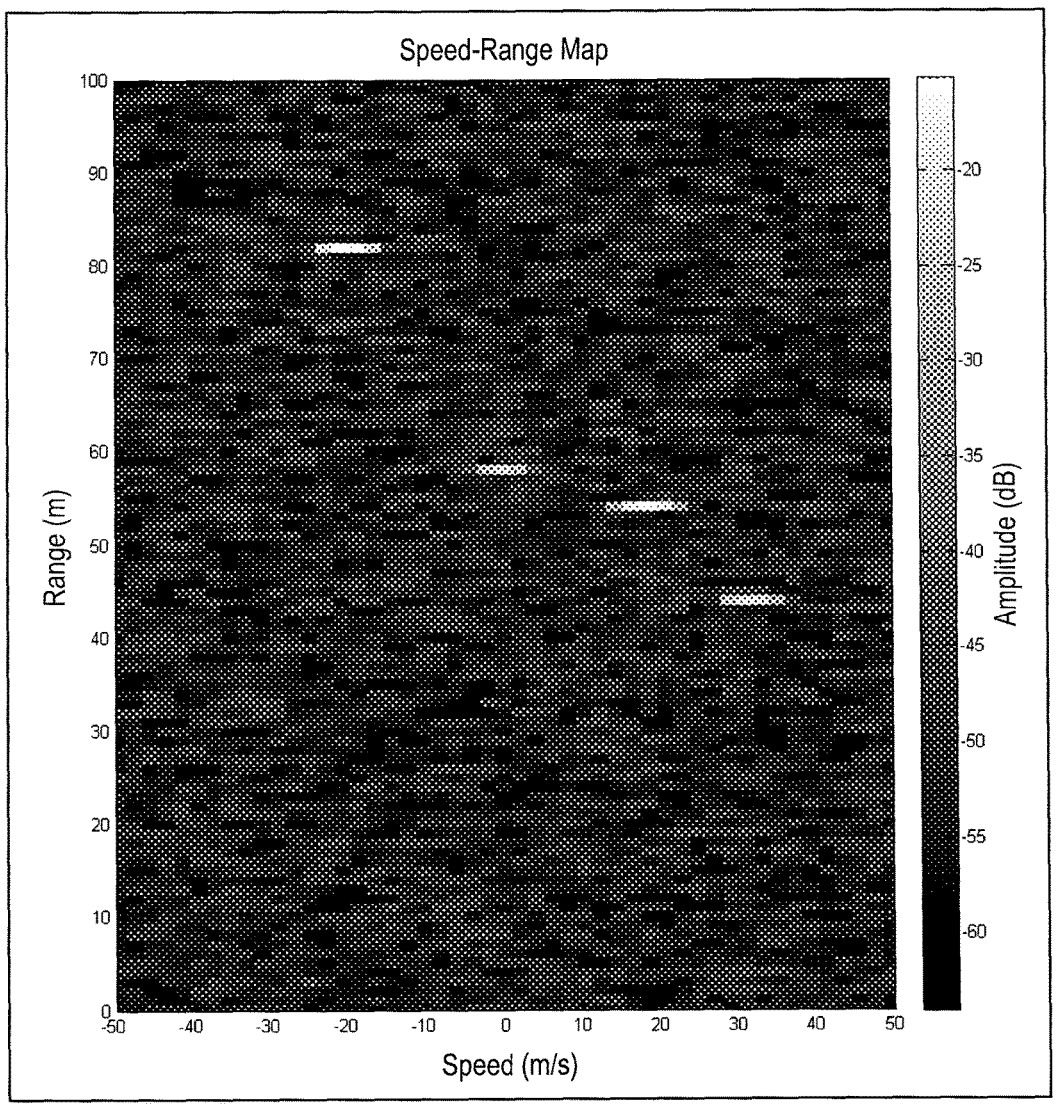
FIG. 5 shows a graphic illustration of an example of a Doppler-Range matrix.

FIG. 5 shows an example of a Speed (or Doppler)-Range matrix (or map) including four targets. The closest target is located at a distance of 45 m having a speed of +30 m/s relative to the radar system. The second closest target is found at 54 m distance with the speed of 20 m/s. Next target is located 58 m away from the radar and has the identical speed than the radar platform. The most remote target is at a distance of 83 m with the speed of −20 m/s relative to the radar itself.

The Doppler-Range matrix provides a unique relationship of speed (Doppler) and distance (range) for each target in the radared scene, i.e. in the radar field of view. A maximum detection unit 40 within the control unit 4a identifies the target providing highest velocity. The range of this target is selected in a selection unit 41. The range information is forwarded to the lens focus trimmer 21, representing the focusing unit, to adjust the focus to the distance of the desired target, i.e. to control the camera optics 22 to focus on the selected distance.

As a next step the picture of the optical field of view is recorded on the charge-coupled device (CCD) sensor 23 and further processed by the image processing unit 24. The speed of the target (and/or the distance or other information obtained by the radar system) may further be stored along with the recorded image, e.g. in the images exchangeable image file format (EXIF) data. Further, speed and range of all other identified targets, derivable from the Doppler-Range matrix, may also be saved in the EXIF data.

In the case of a 'Macro' image (compared to a long range image) the properties of the radar system can be adapted. For instance, in order to radar short distances the radar observation time or signal repetition time of the radar signals may be shortened to avoid the reflections to arrive before transmission is ended. If the scene of interest is in a long distance to the camera the radar observation time or signal repetition time may be expanded. Shortening the radar observation time can be done by using shorter OFDM symbols with less carriers or sending a reduced number of OFDM symbols. Of course, expanding the observation time can be done with enlarging the number of carriers or sending longer OFDM symbols.

In addition the photographer may adjust the resolution of the speed to be detected by the camera. A fine speed resolution is achieved with a long observation time. A low speed resolution, but a short measurement time is achieved with a short radar observation time. For instance, scenes including objects with high speed are not captured in close distances and 'macro' mode. Photographing in 'macro' mode, as one potential focusing mode, requires high velocity resolution. When the camera is set to 'macro' mode the observation time of the radar may be enhanced.

In the case of a Frequency Modulated Continuous Wave (FMCW) radar the timings of the ramps might be adjusted to enlarge or shorten the signal time. In the case of a pulse based radar, the pulse repetition timing might be adapted.

Further applications where the generated data pattern could be used. For instance, transmitted OFDM data payload might be utilized to transmit a sequence identifying the camera. In the case of multiple simultaneous photo shots from multiple cameras the device transmitting the radar signal can be identified. This avoids coexistence problems with multiple cameras. Further, data may be transmitted for communication from one camera to another camera system.

Such a communication may be used e.g. to synchronize the cameras so that e.g. flashlights do not interfere among multiple cameras.

The known approach of focusing on the fastest object using the artificial intelligence algorithm, which has been briefly explained above in the background section, may be combined with the proposed OFDM radar approach. OFDM radar is particularly able to measure the speed (Doppler) in a direction to or away from the radar system. An autofocus based on artificial intelligence may further detect targets moving in normal direction e.g. a formula 1 race car passing the spectators' seats in parallel to the tribune. Combining both autofocus approaches will enhance the precision of the distance measures.

In case there are several targets having the selected (e.g. maximum) speed the camera may focus on the target providing the strongest reflected signal level. This results in that either the target of the larger size, i.e. the dominant object in the scene, or the target closer to the camera is focused. Generally, a precise focus is more important at close targets than at targets in a wide distance.

In the above explained embodiments the fastest target (relative to the camera or absolute) shall be focused. In other embodiments, another speed, e.g. the slowest (e.g. stationary) target (relative to the camera or absolute), or a target having the same speed as the camera (i.e. a target that has a relative speed of zero with respect to the camera) may be focused. In still other embodiments a distance (or distance range) may be selected in advance, at which a target shall be focused. This may be useful if e.g. the only standing person in a moving crowd of people shall be focused.

There are several possibilities: Either the camera is moving (e.g. mounted on a car, bicycle, boat, train, plane, any moving platform, etc.) or the camera is mounted fix (e.g. on a tripod). The camera might identify its own movement by interpretation of the radar image or any secondary information like acceleration sensors, tachometer of car, satellite positioning (GPS, Glonass, etc.) information, etc. The camera might identify its own speed and the speed of other objects in the scene. Further, the camera might identify objects with fastest absolute speed and with fastest relative speed towards the camera.

If camera is mounted fixed, the focus might be selected on the fastest object in the view towards the camera or the fastest object in the view away from the camera.

If the camera is moving, the focus might be selected on the object having the fastest absolute speed towards the camera, the object having the fastest absolute speed away from the camera, the object having the fastest relative speed to the camera towards the camera, the object having the fastest relative speed to the camera away from the camera, the object having the same speed as the camera, etc.

If released (or triggered), the camera might record multiple images with individual focus on all of the scenarios described above. The user might select the image satisfying his interest and delete the others. The post processing of the camera might calculate one sharp image of the full scenery out of the multiple images taken (where on each only a part of the scenery is sharp).

Thus, in an embodiment the control unit is configured to select a target within the radar field of view based on a selected speed, to derive the distance of the selected target from the distance and speed information obtained by the radar system and to control the focusing unit to focus said optical system on a target within the optical field of view having the selected speed and the derived distance. In another embodiment the control unit is configured to select a target within the radar field of view based on a selected distance, to derive the speed of the selected target from the distance and speed information obtained by the radar system and to control the focusing unit to focus said optical system on a target within the optical field of view having the selected distance and the derived speed.

In still further embodiments the control unit may be configured to control the focusing unit to focus said optical system i) on a target within the optical field of view having a speed above a selected speed threshold, ii) on the fastest target within the optical field of view or on a target having a relative speed of substantially zero with respect to the camera, or iii) on a target within the optical field of view moving into a predetermined direction, in particular towards or away from the camera.

The various focusing modes may be selected by the user at the camera, e.g. by a user interface 5 (as shown in FIG. 4), such as a knob, button, display or touchscreen showing a menu of selectable focusing modes. In other embodiments of the camera a particular focusing mode is pre-installed, such as in cameras for special applications.

Advantageously, the optical system of the disclosed camera is configured to automatically record an image once it is controlled by the control unit to focus on a target based on a selected distance and/or a selected speed. For instance, if the camera shall be focused on the fastest target in the optical field of view, once the fastest target has been identified and focused an image is automatically recorded (or at least pre-recorded) before the user actually actively starts the recording, e.g. by hitting the recording button of the camera. This avoids any loss of time since the scene, particularly the fastest target, will likely change quickly due to the fast movement of the fastest target.

Generally, the radar system has only a single antenna both for transmission and reception or one antenna for transmission and one antenna for reception, i.e. is configured as a SISO radar system. In another embodiment two or more antennas are provided, i.e. the radar system is configured as MIMO radar system.

Optionally, in addition to distance and speed information angle information (i.e. of the azimuth angle with respect to the camera) of one or more targets, e.g. of the fastest target, can be obtained in an embodiment of the radar system. This is particularly possible by use of a MIMO radar system. The angle information can e.g. be useful to determine which of the targets in an image has a particular speed and distance. For instance, if several targets are shown in an image at substantially the same distance and are all focused, the angle information can be used to determine which of the (focused) targets had a particular speed, e.g. which was the fastest target. The angle information is thus preferably also stored along with the recorded image, e.g. in the EXIF data.

In summary, the proposed camera, autofocus system and autofocus control method provide for various advantageous focusing modes, for instance enable a focusing on fast objects within a scene, which is particularly achieved by use of a radar system for obtaining distance and speed information about targets within the scene and by control of the focusing unit of the camera using the obtained distance and speed information.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed autofocus system may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A camera comprising:
   an optical system configured to record images based on light entering the optical system from an optical field of view, said optical system comprising a focusing unit configured to focus said optical system on a target in the optical field of view,
   a radar system configured to obtain distance and speed information of targets within a radar field of view that is overlapping with said optical field of view, said distance and speed information indicating the distance and speed of targets with respect to the camera, and
   a control unit configured to control the focusing unit to focus said optical system on a target based on a selected distance and/or a selected speed.

2. The camera as defined in embodiment 1,
   further comprising a user interface allowing a user to select a range or value of distance and/or speed to be used by the control unit for controlling the focusing unit.

3. The camera as defined in any preceding embodiment,
   further comprising a user interface allowing a user to select a predetermined focusing mode according to which the control unit automatically controls the focusing unit to focus said optical system on a target having a predetermined distance and/or speed.

4. The camera as defined in any preceding embodiment, wherein said radar system is configured to have a radar field of view that substantially covers the optical field of view, in particular coincides with the optical field of view.

5. The camera as defined in any preceding embodiment, wherein said control unit is configured to select a target within the radar field of view based on a selected speed, to derive the distance of the selected target from the distance and speed information obtained by the radar system and to control the focusing unit to focus said optical system on a target within the optical field of view having the selected speed and the derived distance.

6. The camera as defined in any preceding embodiment, wherein said control unit is configured to select a target within the radar field of view based on a selected distance, to derive the speed of the selected target from the distance and speed information obtained by the radar system and to control the focusing unit to focus said optical system on a target within the optical field of view having the selected distance and the derived speed.

7. The camera as defined in any preceding embodiment, wherein said control unit is configured to control the focusing unit to focus said optical system on a target within the optical field of view having a speed above a selected speed threshold.

8. The camera as defined in any preceding embodiment, wherein said control unit is configured to control the focusing unit to focus said optical system on the fastest target within the optical field of view or on a target having a relative speed of substantially zero with respect to the camera.

9. The camera as defined in any preceding embodiment, wherein said control unit is configured to control the focusing unit to focus said optical system on a target within the optical field of view moving into a predetermined direction, in particular towards or away from the camera.

10. The camera as defined in any preceding embodiment, wherein the radar system is configured to obtain a Doppler-Range matrix of the radar field of view, said Doppler-Range matrix including the distance and speed information of the targets within the radar field of view.

11. The camera as defined in any preceding embodiment, wherein the optical system is configured to automatically record an image once it is controlled by the control unit to focus on a target based on a selected distance and/or a selected speed.

12. The camera as defined in any preceding embodiment, wherein the optical system is configured to record the speed, distance and/or angle information of the target on which the optical system is focused or of all targets within the optical field of view along with a recorded image, in particular in exchangeable image file format data.

13. The camera as defined in any preceding embodiment, wherein the control unit is configured to control one or more parameters, in particular the observation time and/or resolution, of the radar system based on the distance of the targets within the radar field of view.

14. The camera as defined in any preceding embodiment, wherein the radar system is an OFDM radar system.

15. The camera as defined in embodiment 14,
   wherein the control unit is configured to control the observation time of the radar system based on the distance of the targets within the radar field of view by adapting the length and/or number of OFDM symbols transmitted by the radar system.

16. The camera as defined in embodiment 14,
   wherein the OFDM radar system is configured to embed data into the transmitted OFDM signals, wherein said data comprise identification data identifying the camera allowing the camera to identify if received radiation is received in response to radiation transmitted by its radar system or by radar systems of other cameras.

17. The camera as defined in embodiment 14,
wherein the OFDM radar system is configured to embed data into the transmitted OFDM signals, wherein said data comprise synchronization data for synchronizing two or more cameras.

18. The camera as defined in embodiment 13,
wherein the control unit is configured to shorten the observation time and/or the resolution of the radar system to radar targets at short distances and to expand the observation time and/or the resolution of the radar system to radar targets at long distances.

19. The camera as defined in any preceding embodiment, wherein said radar system is configured as MIMO radar system, in particular comprises at least two antennas for transmitting and for receiving signals.

20. The camera as defined in any preceding embodiment, wherein said radar system is configured to obtain angle information of one or more targets within the radar field of view.

21. An autofocus system for a camera comprising:
   a focusing unit configured to focus an optical system of the camera provided for recording images based on light entering the optical system from an optical field of view on a target in the optical field of view, and
   a control unit configured to control the focusing unit to focus said optical system on a target based on a selected distance and/or a selected speed provided by a radar system of the camera provided for obtaining distance and speed information of targets within a radar field of view that is overlapping with said optical field of view, said distance and speed information indicating the distance and speed of targets with respect to the camera.

22. An autofocus control method for a camera comprising:
   receiving distance and speed information of targets within a radar field of view that is overlapping with an optical field of view of an optical system of the camera provided for recording images based on light entering the optical system from an optical field of view on a target in the optical field of view, said distance and speed information being provided by a radar system of the camera provided for obtaining distance and speed information of targets within the radar field of view and indicating the distance and speed of targets with respect to the camera, and
   controlling a focusing unit of the camera to focus said optical system on a target based on a selected distance and/or a selected speed selected from the receiving distance and speed information.

23. A non-transitory computer-readable recording medium that stores therein a computer program product, which, when executed by a processor, causes the method as defined in embodiment 22 to be performed.

24. A computer program comprising program code means for causing a computer to perform the steps of said method according to embodiment 22 when said computer program is carried out on a computer.

The invention claimed is:
1. A camera comprising:
   an optical system configured to record images based on light entering the optical system from an optical field of view, said optical system comprising an autofocus system configured to focus said optical system on a target in the optical field of view;
   a radar system configured to obtain distance and speed information of targets within a radar field of view that overlaps with said optical field of view, said distance and speed information indicating the distance and speed of targets with respect to the camera; and
   circuitry configured to
      select a target within the radar field of view based on a selected distance;
      derive a speed of the selected target from the distance and speed information obtained by the radar system; and
      control the autofocus system to focus said optical system on a target within the optical field of view having the selected distance and the derived speed.

2. The camera as claimed in claim 1, further comprising:
a user interface allowing a user to select a range or value of distance and/or speed to be used by the circuitry for controlling the autofocus system.

3. The camera as claimed in claim 1, further comprising:
a user interface allowing a user to select a predetermined focusing mode according to which the circuitry automatically controls the autofocus system to focus said optical system on a target having a predetermined distance and/or speed.

4. The camera as claimed in claim 1, wherein
said radar system is configured to have a radar field of view that substantially covers the optical field of view.

5. The camera as claimed in claim 1, wherein said circuitry is configured to:
   select a target within the radar field of view based on a selected speed;
   derive the distance of the selected target from the distance and speed information obtained by the radar system; and
   control the autofocus system to focus said optical system on a target within the optical field of view having the selected speed and the derived distance.

6. The camera as claimed in claim 1, wherein
said circuitry is configured to control the autofocus system to focus said optical system on a target within the optical field of view having a speed above a selected speed threshold.

7. The camera as claimed in claim 1, wherein
said circuitry is configured to control the autofocus system to focus said optical system on the fastest target within the optical field of view or on a target having a relative speed of substantially zero with respect to the camera.

8. The camera as claimed in claim 1, wherein
said circuitry is configured to control the autofocus system to focus said optical system on a target within the optical field of view moving into a predetermined direction in relation to the camera.

9. The camera as claimed in claim 1, wherein
the radar system is configured to obtain a Doppler-Range matrix of the radar field of view, said Doppler-Range matrix including the distance and speed information of the targets within the radar field of view.

10. The camera as claimed in claim 1, wherein
the optical system is configured to automatically record an image once it is controlled by the circuitry to focus on a target based on a selected distance and/or a selected speed.

11. The camera as claimed in claim 1, wherein
the optical system is configured to record the speed and/or distance information of the target on which the optical system is focused or of all targets within the optical field of view along with a recorded image.

12. The camera as claimed in claim 1, wherein
the circuitry is configured to control an observation time and/or resolution of the radar system based on the distance of the targets within the radar field of view.

13. The camera as claimed in claim 1, wherein
the radar system is an OFDM radar system.

14. The camera as claimed in claim 13, wherein
the circuitry unit is configured to control an observation time of the radar system based on the distance of the targets within the radar field of view by adapting the length and/or number of OFDM symbols transmitted by the radar system.

15. The camera as claimed in claim 13, wherein
the OFDM radar system is configured to embed data into the transmitted OFDM signals, wherein said data comprise identification data identifying the camera allowing the camera to identify if received radiation is received in response to radiation transmitted by its radar system or by radar systems of other cameras.

16. The camera as claimed in claim 13, wherein
the OFDM radar system is configured to embed data into the transmitted OFDM signals, wherein said data comprise synchronization data for synchronizing two or more cameras.

17. An autofocus system for a camera comprising:
an autofocus system configured to focus an optical system of the camera provided for recording images based on light entering the optical system from an optical field of view on a target in the optical field of view; and
circuitry configured to
  acquire distance and speed information of targets within a radar field of view that overlaps with said optical field of view from a radar system, said distance and speed information indicating the distance and speed of targets with respect to the camera;
  select a target within the radar field of view based on the selected distance;
  derive a speed of the selected target from the distance and speed information acquired from the radar system; and
  control the autofocus system to focus said optical system on a target within the optical field of view having the selected distance and the derived speed.

18. An autofocus control method for a camera comprising:
  receiving distance and speed information of targets within a radar field of view that overlaps with an optical field of view of an optical system of the camera provided for recording images based on light entering the optical system from an optical field of view on a target in the optical field of view, said distance and speed information being provided by a radar system of the camera provided for obtaining distance and speed information of targets within the radar field of view and indicating the distance and speed of targets with respect to the camera;
  selecting a target within the radar field of view based on a selected distance;
  deriving a speed of the selected target from the distance and speed information provided by the radar system; and
  controlling an autofocus system of the camera to focus said optical system on a target within the optical field of view having the selected distance and the derived speed.

19. A non-transitory computer-readable recording medium that stores therein a computer program product, which, when executed by a processor, causes the method as claimed in claim 18 to be performed.

* * * * *